(12) United States Patent
Dishman et al.

(10) Patent No.: US 8,159,837 B2
(45) Date of Patent: Apr. 17, 2012

(54) INTEGRATED BIAS AND STANDBY POWER SUPPLY CIRCUIT

(75) Inventors: Cecil C. Dishman, Raleigh, NC (US);
Jen-Ching Lin, Apex, NC (US);
Randhir S. Malik, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 12/259,146

(22) Filed: Oct. 27, 2008

(65) Prior Publication Data

US 2010/0102793 A1  Apr. 29, 2010

(51) Int. Cl.
*H02M 3/335* (2006.01)
(52) U.S. Cl. ............... 363/17; 363/21.06; 363/21.14
(58) Field of Classification Search ............ 363/15, 363/16, 17, 65, 89, 97, 127, 131; 323/266, 323/267
See application file for complete search history.

(56) References Cited

U.S. PATENT DOCUMENTS

| | | | |
|---|---|---|---|
| 5,532,524 A | 7/1996 | Townsley et al. | |
| 5,576,941 A | 11/1996 | Nguyen et al. | |
| 5,691,889 A * | 11/1997 | Bazinet et al. | 363/89 |
| 5,694,889 A * | 12/1997 | Ball et al. | 123/41.7 |
| 5,995,396 A | 11/1999 | Byrne et al. | |
| 6,057,607 A * | 5/2000 | Rader et al. | 307/11 |
| 6,181,114 B1 | 1/2001 | Hemena et al. | |
| 6,587,356 B2 * | 7/2003 | Zhu et al. | 363/17 |
| 6,661,279 B2 | 12/2003 | Yabe | |
| 7,532,493 B2 * | 5/2009 | Lou et al. | 363/65 |
| 7,564,700 B2 * | 7/2009 | Hansson et al. | 363/16 |
| 7,574,617 B2 * | 8/2009 | Park | 713/320 |
| 7,800,922 B2 * | 9/2010 | Takayanagi et al. | 363/17 |
| 7,800,923 B2 * | 9/2010 | Yang | 363/21.06 |
| 2002/0172061 A1 | 11/2002 | Phadke | |
| 2008/0089100 A1 | 4/2008 | Park et al. | |
| 2009/0119525 A1 | 5/2009 | Morimoto et al. | |

FOREIGN PATENT DOCUMENTS

| | | |
|---|---|---|
| CN | 1980020 A | 6/2007 |
| EP | 0468769 A2 | 1/1992 |
| WO | 2005011990 A1 | 2/2005 |

* cited by examiner

*Primary Examiner* — Gary L Laxton
*Assistant Examiner* — Zekre Tsehaye
(74) *Attorney, Agent, or Firm* — Kunzler Needham Massey & Thorpe

(57) ABSTRACT

An apparatus, system, and method are disclosed for efficiently providing bias voltages. A first switching regulator stage that includes an inductor receives an input voltage and provides as an output an intermediate regulated output voltage. A second switching regulator stage receives as input the intermediate regulated output voltage and outputs a regulated main output voltage. The second switching regulator stage includes at least one switch controller that provides one or more signals to one or more switches in the second switching regulator stage to regulate the main output voltage of the second regulator stage. A secondary bias module utilizes a secondary winding coupled with the inductor of the first regulator stage to provide a secondary bias output voltage to the switch controller of the second switching regulator stage. The secondary bias output voltage is referenced to the main output voltage of the second switching regulator stage.

17 Claims, 5 Drawing Sheets

INTEGRATED BIAS AND STANDBY POWER SUPPLY CIRCUIT

BACKGROUND

1. Field of the Invention

This invention relates to power supplies and more particularly relates to improving the efficiency of a power system by utilizing an integrated bias and standby power supply circuit.

2. Description of the Related Art

A power supply, sometimes known as a power supply unit or PSU, is a device or system that supplies electrical or other types of energy to a load or group of loads. A power supply, in some embodiments may be configured to convert power in one form to another form, such as converting alternating current ("AC") power to direct current ("DC") power. The regulation of power supplies is typically done by incorporating circuitry to tightly control the output voltage and/or current of the power supply to a specific value. The specific value is typically closely maintained despite variations in the load presented to the power supply's output, or any reasonable voltage variation at the power supply's input.

For example, in an electronic device such as a computer, the power supply is typically designed to convert an AC voltage input such as is traditionally provided by a conventional wall socket, into several low-voltage DC power outputs for transmission to the internal components of the electronic device. Conversion is typically performed in stages that may include various stages such as a rectification stage, a pre-regulation stage such as an active harmonic filter, a regulator/chopper stage, etc. The stages may be configured in various topologies such as a boost stage, a buck stage, or other derivative topology.

In addition to providing main power outputs to various electronic devices, power supplies are often configured to provide auxiliary and standby power to background systems and sub-systems within an electronic device. For example, even when an electronic device is not fully operational, or is turned off, power may still be needed to power system clocks, system controllers, system monitors and the like. Conventional power supplies typically include several stages of power conversion in order to provide both main power as well as standby and auxiliary power. In some embodiments, the power supply itself may require auxiliary power to run the control and drive circuits within the power supply. This is typically accomplished by utilizing a flyback stage to create bias voltages. Such bias voltages are typically derived from the main output voltage by implementing additional conversion stages, which can be expensive to implement as well as decrease the efficiency of the power supply.

For example, in a power supply that provides a 12 volt main output voltage, a DC to DC regulator may be utilized to convert the 12 volt output to a 3.3 volt output to provide power to standby circuits. The additional DC to DC regulator results in a significant additional power loss and can be costly to implement. This embodiment is inefficient because inefficiencies are compounded where the 3.3 volt power is converted multiple times and losses occur at each stage. In some embodiments, several additional DC to DC regulators may be required to generate additional voltage levels that may be needed in the auxiliary and standby circuitry. The net result of such conventional methods of providing standby and auxiliary power is that the overall efficiency of the power system is lower and the cost is higher.

BRIEF SUMMARY

From the foregoing discussion, it should be apparent that a need exists for an apparatus, system, and method that integrates a bias and standby power supply circuit to more efficiently provide standby and auxiliary power. Beneficially, such an apparatus, system, and method would generate bias voltages via an inductor in a first stage of a power supply to provide standby and auxiliary power without the overuse of flyback converters or additional DC to DC converters. Most power supplies include a first stage for regulating power that includes an inductor as part of the topology. For example, a common topology is a boost converter that includes an inductor, a switch, a diode, and a capacitor. In accordance with the present invention, a secondary winding may be coupled with the inductor of the first stage to provide a bias output voltage that may be used to power auxiliary circuits such as the control circuits of the power supply. By utilizing voltages generated via the inductor of the first stage, conventional series-connected flyback and DC to DC converters may be eliminated from the power supply, thereby improving efficiency and reducing cost.

The present invention has been developed in response to the present state of the art, and in particular, in response to the problems and needs in the art that have not yet been fully solved by currently available power supplies. Accordingly, the present invention has been developed to provide an apparatus, system, and method to provide bias voltages in an efficient low cost manner that overcome many or all of the above-discussed shortcomings in the art.

The apparatus to provide bias voltages in an efficient low cost manner is provided with a plurality of modules and stages including a first switching regulator stage, a second switching regulator stage, and a secondary bias module.

The first switching regulator stage receives an input voltage and provides as an output an intermediate regulated output voltage, and the first switching regulator stage includes at least one inductor. The second switching regulator stage receives as input the intermediate regulated output voltage from the first switching regulator stage and outputs a regulated main output voltage. The second switching regulator stage includes at least one switch controller that provides one or more signals to one or more switches in the second switching regulator stage to regulate the main output voltage of the second regulator stage. The secondary bias module utilizes a secondary winding coupled with the inductor of the first regulator stage to provide a secondary bias output voltage to the switch controller of the second switching regulator stage. The secondary bias output voltage is referenced to the main output voltage of the second switching regulator stage.

In one embodiment, the secondary bias output voltage and the main output voltage of the second switching regulator stage are referenced to a common ground. In a further embodiment, the second switching regulator stage includes a transformer, and the transformer includes a secondary winding from which the main output voltage is derived. The common ground is referenced to the secondary winding side of the transformer. In yet further embodiment, the transformer also includes a second secondary winding from which an auxiliary output voltage is derived. The auxiliary output voltage is regulated by one or more switches controlled by the switch controller of the second switching regulator stage.

The apparatus may also include a standby module that, in response to receiving a standby signal, shuts off switching of the one or more switches of the second switching regulator stage that regulate the main output voltage such that the main output voltage is shut off. In such an embodiment, auxiliary power may still be provided via the second secondary winding of the transformer. In one embodiment, the secondary bias module further includes a linear regulator for regulating the secondary bias output voltage.

In one embodiment, the first switching regulator stage includes a switch controller that provides one or more signals to one or more switches in the first switching regulator stage to regulate the intermediate regulated voltage. A primary bias module may also be provided that utilizes a second secondary winding coupled with the inductor of the first regulator stage to provide a primary bias output voltage to the switch controller of the first switching regulator stage. The primary bias module may include a linear regulator for regulating the primary bias output voltage. In this manner, bias voltages may be provided to switch controllers of both the first and second switching regulator stages, wherein the bias voltage are properly referenced to nodes within each of the stages.

A system of the present invention is also presented to provide bias voltages. The system substantially includes the embodiments described above with regard to the apparatus. The system may be embodied with a switching power supply, a first switching regulator stage, a second switching regulator stage, and a secondary bias module.

Similar to the apparatus, the first switching regulator stage receives an input voltage and provides as an output an intermediate regulated output voltage, wherein the first switching regulator stage comprises at least one inductor. The second switching regulator stage of the power supply receives as input the intermediate regulated output voltage from the first switching regulator stage and outputs a regulated main output voltage. The second switching regulator stage includes at least one switch controller that provides one or more signals to one or more switches in the second switching regulator stage to regulate the main output voltage of the second regulator stage. The secondary bias module utilizes a secondary winding coupled with the inductor of the first regulator stage to provide a secondary bias output voltage to the switch controller of the second switching regulator stage. The secondary bias output voltage is preferably referenced to the main output voltage of the second switching regulator stage.

The system may further include one or more electronic devices that receive regulated power from the switching power supply. In one embodiment, at least one of the one or more electronic devices comprises one of a blade server, peripheral component interconnect ("PCI") card, personal computer, laptop, router, switch, personal digital assistant, appliance, and digital media player.

In one embodiment, the second switching regulator stage includes a transformer. The transformer includes a secondary winding from which the main output voltage is derived. In a further embodiment, the transformer further comprises a second secondary winding from which an auxiliary output voltage is derived, the auxiliary output voltage regulated by one or more switches controlled by the switch controller of the second switching regulator stage.

In further embodiments, the first switching regulator stage includes a switch controller that provides one or more signals to one or more switches in the first switching regulator stage to regulate the intermediate regulated voltage. A primary bias module may also be provided that utilizes a second secondary winding coupled with the inductor of the first regulator stage to provide a primary bias output voltage to the switch controller of the first switching regulator stage. The primary bias module may include a linear regulator for regulating the primary bias output voltage.

A method of the present invention is also presented for efficiently providing bias voltages. The method in the disclosed embodiments substantially includes the steps necessary to carry out the functions presented above with respect to the operation of the described apparatus and system. In one embodiment, the method includes receiving an input voltage with a first switching regulator stage and providing as an output an intermediate regulated output voltage, wherein the first switching regulator stage comprises at least one inductor. The method also may include receiving as an input to a second switching regulator stage the intermediate regulated output voltage from the first switching regulator stage and providing as an output a regulated main output voltage.

The second switching regulator stage includes at least one switch controller that provides one or more signals to one or more switches in the second switching regulator stage to regulate the main output voltage of the second regulator stage. The method may also include utilizing a secondary winding coupled with the inductor of the first regulator stage to provide a secondary bias output voltage to the switch controller of the second switching regulator stage. The secondary bias output voltage is preferably referenced to the main output voltage of the second switching regulator stage.

In a further embodiment of the method, the second switching regulator stage further comprises a transformer. The transformer includes a secondary winding from which the main output voltage is derived. The transformer may also include a second secondary winding from which an auxiliary output voltage is derived. The auxiliary output voltage may be regulated by one or more switches controlled by the switch controller of the second switching regulator stage as powered by the bias voltages derived via the inductor of the first regulating stage.

In a further embodiment, the method includes shutting off switching of the one or more switches of the second switching regulator stage that regulate the main output voltage such that the main output voltage is shut off in response to receiving a standby signal.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
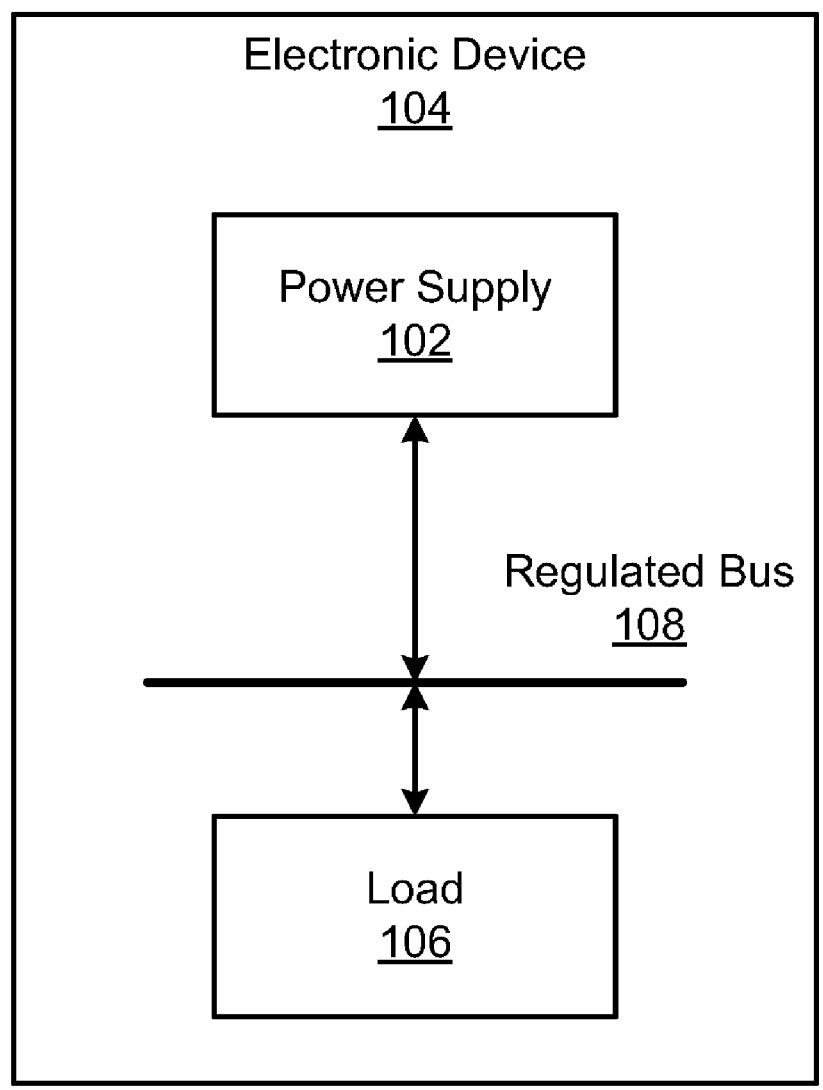
FIG. 1 is a schematic block diagram illustrating one embodiment of a system to provide bias voltages in an efficient low cost manner in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 with an integrated bias and standby power supply circuit in accordance with the present invention. The system 100 includes a power supply 102, an electronic device 104, a regulated bus 108, and a load 106.

The power supply 102 provides regulated power to the electronic device 104 to power various electronic systems and subsystems within the electronic device 104. The power supply is typically connected to the electronic device 104 by a regulated bus 108 or similar device. The regulated bus 108 and power supply 102 may be configured to provide one or more different voltages and currents to the electronic device 104. For example, in a typical power supply, voltages of +12 v, +5 v, +3.3 v, and −12 v are commonly provided. Preferably the power supply 102 is a switching power supply. As will be recognized by those of skill in the art a switching power supply or switched-mode power supply ("SMPS") is a power supply that incorporates a switching regulator. A switching regulator regulates power by switching a transistor or other switch on and off with a variable duty cycle to produce a desired output signal.

In various embodiments, the electronic device 104 may be a computer system, such as a desktop, laptop, or server, and the power supply 102 may be configured to provide power to the various components of the computer system. In other embodiments, the electronic device 104 may include devices such as a blade server, a peripheral component interconnect ("PCI") card, routers, personal digital assistants (PDAs), switches, appliances, digital media players, displays, or other electronic devices as recognized by one of skill in the art. In one embodiment, the power supply 102 may be implemented within the same enclosure as the electronic device 104, such as within a computer tower case. In other embodiments, the power supply 102 may be implemented external to the electronic device 104 and may be connected to the electronic device 104 via a connection means such as a cord, cable, or bus such as in a blade center.

The electronic device 104 causes a load 106 to be applied to the power supply 102. The amount of load 106 may affect the performance of the power supply 102. The power supply 102 is preferably configured to operate efficiently in conjunction with a specified load 106. In one embodiment, the load 106 may vary depending on the operation characteristics of the electronic device 104 and the power supply 102 may be configured to adjust accordingly. For example, the power supply 102 may include a feedback signal for adjusting the power output characteristics of the power supply 102 in response to changes in the load 106. Typically, the power supply 102 regulates the voltage on the regulated bus 108 so as to provide substantially constant voltage levels to the electronic device 104 under varying load conditions. In various embodiments, the load 106 may be inside the electronic device 104, outside the electronic device 104, or both.

In accordance with the present invention, the system 100 is preferably configured to provide bias, auxiliary, and standby voltages in an efficient and cost effective manner. A typical power supply 102 may include various different stages for converting and regulating voltages and currents. The various types of stages may include, for example, buck converters, boost converters, flyback converters, etc. as well as many variations of these types of stages. The regulation stages typically utilize an inductor in conjunction with some configuration of a diode, a capacitor, and switch to provide a regulated power source.

In a particularly common configuration, a rectification stage may be utilized to rectify an incoming alternating current ("AC") signal as is typically provided from a wall outlet. In one embodiment a boost regulator or boost converter may be provided to receive the rectified signal and convert it to a boosted direct current ("DC") voltage signal, usually about 400 volts. Of course, in various embodiments the boosted voltage may be provided at other voltage levels. The boosted signal is then provided to one or more secondary stages which further convert the signal into a desired format such as 12, 5, and 3.3 volt signals. Numerous additional stages are often needed to obtain all of the desired bias, auxiliary, and standby power signals that are needed. This results in large power losses and inefficiency and the additional stages can be expensive to build and implement.

The present invention reduces the power losses and high cost by utilizing a secondary winding coupled to an inductor in a first regulator stage to provide the appropriate bias voltages to power primary and secondary control circuits. A transformer in a second regulator stage may also be modified to more efficiently provide standby and auxiliary voltages by utilizing a second secondary winding of the transformer as will be described in detail below.

Figure 2:
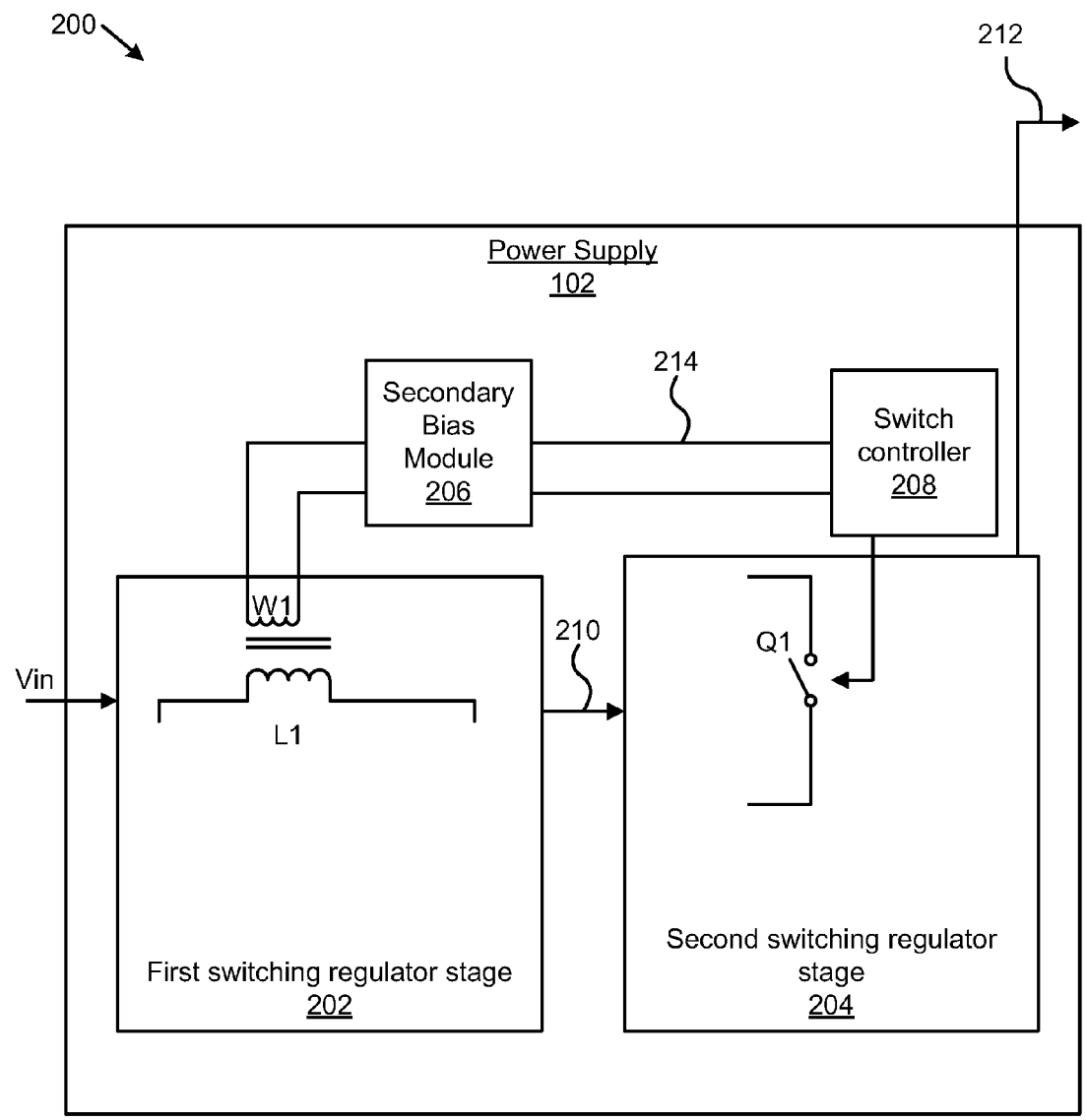
FIG. 2 is a schematic block diagram illustrating one embodiment of a power supply to provide bias voltages in accordance with the present invention.

FIG. 2 is a schematic block diagram illustrating one embodiment 200 of the power supply 102 to provide bias voltages in accordance with the present invention. As will be recognized by those of skill in the art, FIG. 2 depicts a simplified embodiment 200 of the power supply 102. In this embodiment, the power supply 102 includes a first switching regulator stage 202, a second switching regulator 204, and a secondary bias module 206.

The first switching regulator 202 includes at least one inductor L1. In various embodiments, the inductor L1 may be utilized with other components in numerous configurations and topologies such as in a buck or boost topology. The first switching regulator 202 also typically includes switching circuitry, usually one or more transistors, that may be switched on and off at a particular duty cycle to provide a desired intermediate regulated output voltage 210. The first switching regulator 202 receives an input voltage and utilizes the switching regulator circuitry to generate the desired intermediate regulated output signal 210.

Figure 3:
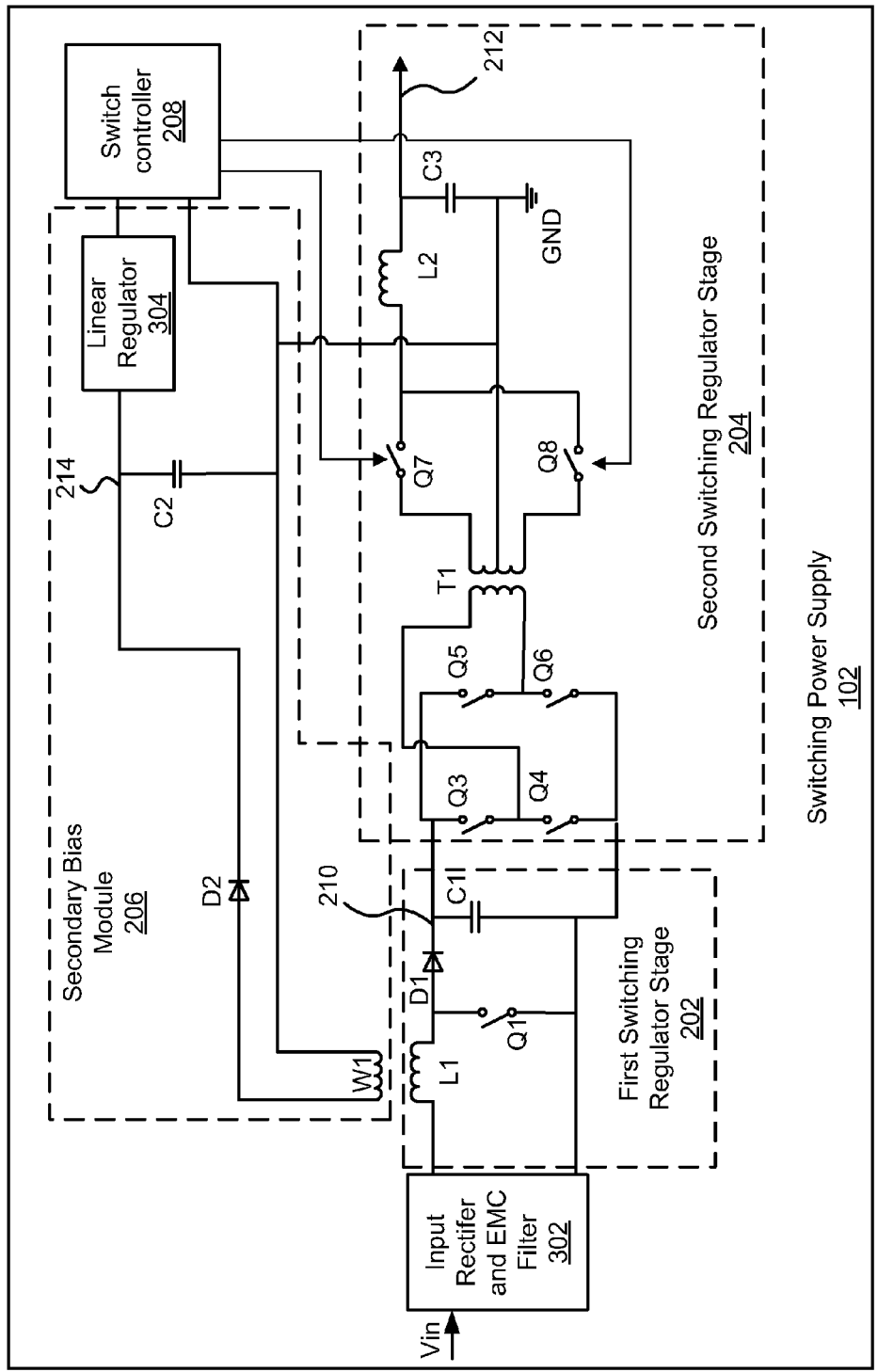
FIG. 3 is a schematic block diagram illustrating one detailed embodiment of a power supply to provide bias voltages in accordance with the present invention.

The second switching regulator stage 204 receives as input the intermediate regulated output voltage 210 from the first switching regulator stage 202. In various embodiments, the second switching regulator stage 204 may be implemented utilizing various topologies as will be recognized by those of skill in the art. Some common topologies include half-bridge converters, full-bridge converters, buck converters, boost converters, or variations of these topologies. A full-bridge converter typically utilizes a configuration of four switches or transistors to pass current through a transformer in alternating directions as can be seen in FIG. 3.

The second switching regulator stage 204 preferably includes at least one switch Q1, such as a transistor, that is used to regulate a main output voltage 212. The main output voltage 212 is typically the main power supplied from the power supply 102 to the electronic device 104. Other types of power may include auxiliary and standby power that are typically used to power the background and control systems of the electronic device. The second switching regulator stage 204 is controlled by a switch controller 208 that provides switch control signals to the switches Q1 in the second switching regulator stage. The switch control signals are configured to turn the switch Q1 on or off such that the main output voltage 212 is regulated to a desired level.

In conventional systems, the switch controller 208 is powered by additional regulator stages or flyback stages that typically convert the main output voltage 212 into different voltages for use by the switch controller 208 and other control systems. In accordance with the present invention, the secondary bias module 206 is provided to utilize a secondary winding W1 coupled with the inductor of the first regulator stage 202 to provide a secondary bias output voltage 214 to the switch controller 208 of at least the second switching regulator stage 204. By utilizing a winding W1 coupled to the inductor L1 of the first switching regulator stage 202, costly additional regulator stages are eliminated and the power supply 102 becomes more energy efficient.

The switching of one or more switches in the first switching regulator stage 202 to regulate the intermediate output voltage 210 also operates to cause a current to flow through the inductor L1 which in turn causes a current to flow through the secondary winding W1. The current through the inductor L1 typically has an AC component that causes transformer action so that a current is generated the secondary winding W1 that is related to the current through inductor L1 by a turns ratio of the inductor L1 and the secondary winding W1. This enables the bias output voltage 214 to be generated without the need of an additional regulator stage.

The secondary bias module 206 typically includes circuitry such as a diode and a capacitor to maintain the appropriate bias output voltage 214. In some embodiments, a linear regulator may also be used to further regulate the bias output voltage 214. Preferably, the secondary bias output voltage 214 is referenced to the main output voltage 212, or other common reference voltage or ground, to ensure that the secondary bias output voltage 214 as derived from the inductor L1 of the first switching regulator stage 202 operates properly relative to the components of the second switching regulator stage 204 and switch controller 208.

FIG. 3 is a schematic block diagram illustrating one detailed embodiment of the power supply 102 to provide bias voltages in accordance with the present invention. In this embodiment, an input voltage Vin is provided to an input rectifier and EMC filter 302. The input rectifier 302 is typically used where the input voltage Vin is an AC voltage signal. The input rectifier 302 converts the AC voltage signal Vin to a DC voltage signal and provides the DC voltage signal to the first switching regulator stage 202 as an input voltage.

In the depicted embodiment, the first switching regulator stage 202 is implemented as a boost converter. The boost converter includes the inductor L1 in conjunction with a switch Q1, a diode D1, and a capacitor C1. As will be recognized by those of skill in the art, the boost converter operates by switching the switch Q1 on and off to provide power to the capacitor C1. When the switch Q1 is turned on, energy is stored in the inductor L1. After a predetermined period of time, the switch Q1 is turned off, and the energy stored in the inductor is delivered to the capacitor C1 via the diode D1. The intermediate output voltage 210 in this embodiment is the voltage maintained across the capacitor C1. The intermediate output voltage 210 is regulated by the duty cycle of the switch Q1.

As depicted, the second switching regulator stage 204 is implemented with a full-bridge converter topology. The second switching regulator stage 204 includes four full-bridge switches Q3, Q4, Q5, Q6 and two additional switches Q7, Q8. In this embodiment, the second switching regulator stage 204 also includes another inductor L2 and capacitor C3 for use in filtering and regulating the main output voltage 212.

The full-bridge operates by alternately turning on and turning off pairs of switches Q3, Q6, and Q4, Q5 to control the direction of current flow through the primary winding of a transformer T1. In effect, the full-bridge operates to "chop" the intermediate output voltage 210. The chopped voltage is applied to the primary winding of the transformer T1 and transferred to the secondary side by the transformer T1. On the secondary side of the transformer T1, the voltage is rectified by the switching of the additional switches Q7, Q8 and filtered by the inductor L2 and the capacitor C3 to provide the regulated main output voltage 212.

The switches Q7, Q8 are controlled by the switch controller 204 which receives power from the secondary bias module 206. The secondary bias module, in this embodiment, includes a secondary winding W1, a diode D2, a capacitor C2, and a linear regulator 304. The winding W1 is coupled with the inductor L1 from the first regulator stage 202 to pass power from the first regulator stage 202 to the secondary bias module 206. A bias output voltage 214 is maintained across the capacitor C2 and may be passed through the linear regulator 304 to power various components and circuitry such as the switch controller 208. In a common configuration, the output bias voltage 214 is maintained at about 5 volts.

Figure 4:
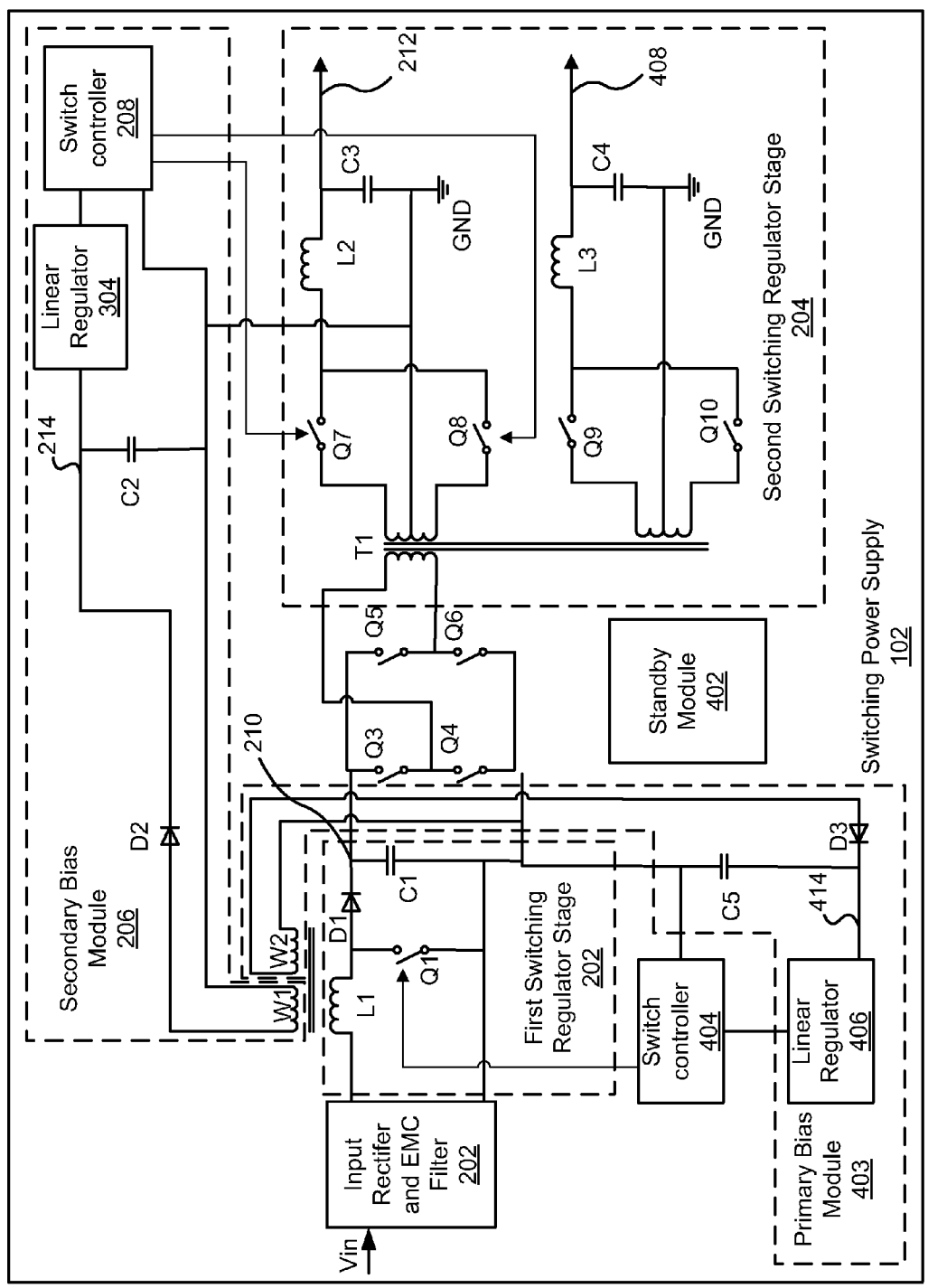
FIG. 4 is a schematic block diagram illustrating another embodiment of a of a power supply for providing bias voltages in accordance with the present invention.

FIG. 4 is a schematic block diagram illustrating another embodiment of a of a power supply 102 for providing bias voltages in accordance with the present invention. In this embodiment, the power supply 102 operates substantially similar to that depicted in FIG. 3 with the addition of some circuitry to provide a primary bias voltage to a primary switch controller 404 for the first regulator stage 202, to provide an auxiliary output voltage 408 for powering auxiliary systems in the electronic device 204, and to provide a standby module 402 for shutting down the main power when needed.

In this embodiment, the first switching regulator stage 202 utilizes primary switch controller 404 that provides one or more signals to one or more switches Q1 in the first switching regulator stage 202 to regulate the intermediate regulated voltage 210. The primary switch controller 404 operates to turn on and turn off the switch Q1 to regulate the voltage across the capacitor C1. A primary bias module 403 is provided to provide power to the primary switch controller 404. The primary bias module 403 includes substantially the same functionality described above with regard to the secondary bias module 304, except the primary bias module 403 provides power to the primary switch controller 404. Like the secondary bias module 304, the primary bias module 403 may include a diode D3, a capacitor C5, and a linear regulator 406.

The primary bias module 403 utilizes a second secondary winding W2 coupled with the inductor L1 of the first regulator stage 204 to provide a primary bias output voltage 414 across the capacitor C5. The primary bias output voltage 414 may then be utilized to provide power to the primary switch controller 404.

In the depicted embodiment, the second switching regulator stage 204 includes additional circuitry to provide an auxiliary output voltage 408 for providing power to auxiliary systems and sub-systems. The auxiliary output voltage 408 is commonly provided at 3.3 volts. In conventional systems, an additional converter stage or flyback stage may be required to provide auxiliary power, but in accordance with the present invention, a second secondary winding is coupled with the transformer T1 to derive the auxiliary output voltage 408 without the use of an additional converter stage or flyback stage. As depicted, the auxiliary output voltage 408 is generated by using two additional switches Q9 and Q10 to rectify a received signal chopped by the full-bridge switches Q3, Q4, Q5, Q6 and passed through the transformer T1.

After rectification by the switches Q9, Q10, the auxiliary output voltage 408 is filtered by an inductor L3 and a capacitor C4 in the same manner described for the main output voltage 212. The voltage level may be determined by the number of windings in the second secondary winding of the transformer T1.

The additional auxiliary switches Q9, Q10 are preferably controlled by the same switch controller 208 that control the main voltage switches Q7, Q8. Typically, the switches Q7, Q8, Q9, Q10 are regulated on a weighted average basis. In this manner, an auxiliary and/or standby voltage may be generated without using a separate flyback power supply and/or a separate additional converter stage.

The standby module 402 operates to increase efficiency and allow the power supply 102 to continue providing auxiliary and standby power even when the main power 212 is turned off. In one embodiment, the standby module, in response to receiving a standby signal or other signal, shuts off switching of the one or more main voltage switches Q7, Q8 of the second switching regulator stage 204, such that the main output voltage 212 is shut off, but where the auxiliary output voltage 408 continues to be provided.

For example, an electronic device such as a computer system may be powered down to operate in a standby or hibernate mode where the main output power is not needed, but where auxiliary power is still required. In conventional systems, the switches Q7, Q8 had to continue switching on and off to provide power to the additional subsequent converter stages that were needed to generate auxiliary power. However, in accordance with the present invention, the main power switches Q7, Q8 can be turned off, thereby eliminating switching losses for those switches, while still providing an auxiliary output voltage 408 through the second secondary winding of the transformer T1.

Figure 5:
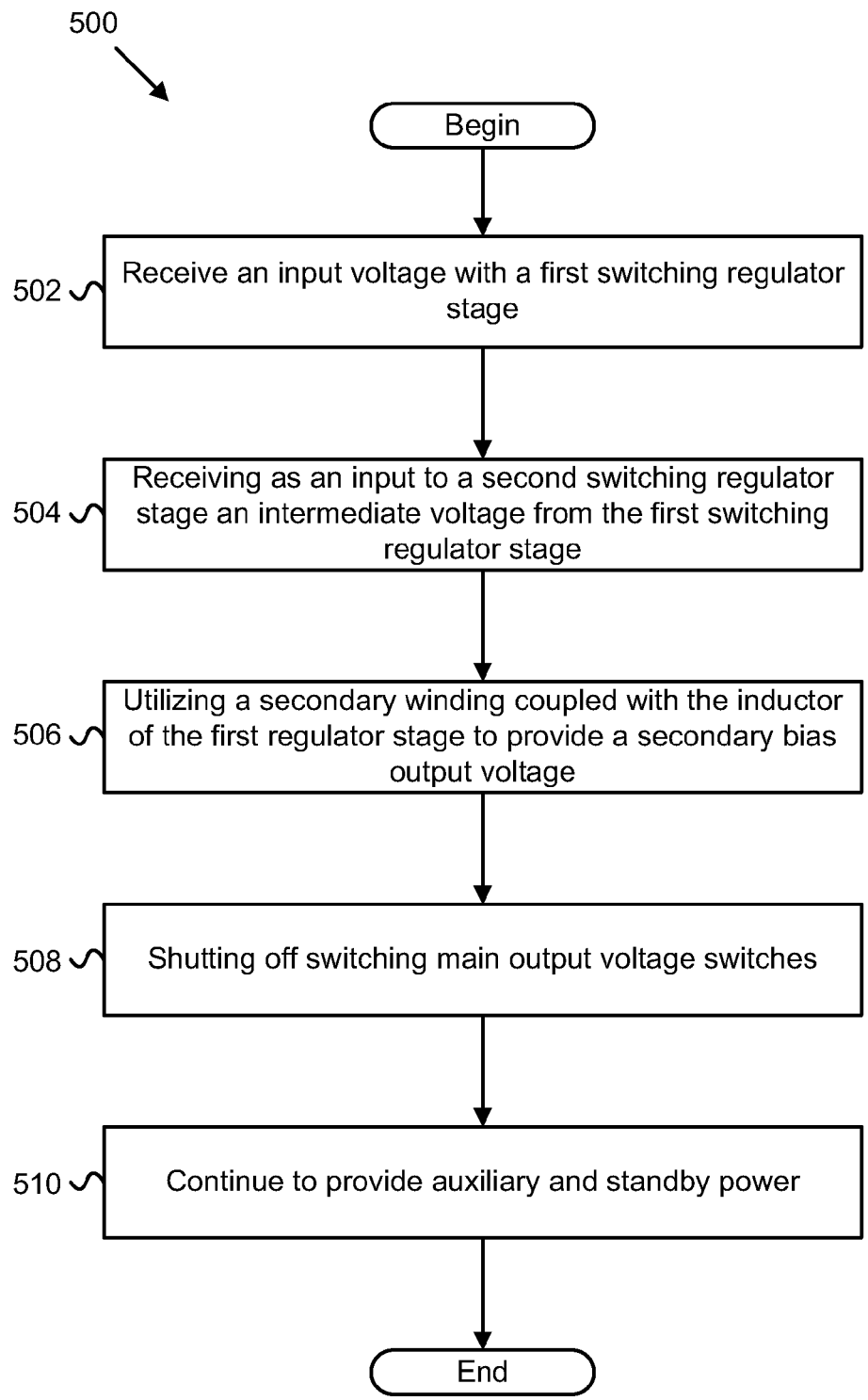
FIG. 5 is a schematic flow chart diagram illustrating one embodiment of a method for providing bias voltages in accordance with the present invention.

FIG. 5 is a schematic flow chart diagram illustrating one embodiment of a method 500 for providing bias voltages in accordance with the present invention. The method 500 includes substantially the same embodiments described above with regard to the system 100 and the power supply 102.

The method begins by receiving 502 an input voltage with a first switching regulator stage 202 and providing as an output an intermediate regulated output voltage 210. The first switching regulator stage 202 includes at least one inductor L1. A second switching regulator stage 204 receives 504 as input the intermediate regulated output voltage 210 from the first switching regulator stage 202 and provides as an output a regulated main output voltage 212. The second switching regulator stage 204 preferably includes at least one switch controller 304 that provides one or more signals to one or more switches Q7, Q8 in the second switching regulator stage 204 to regulate the main output voltage 212 of the second regulator stage 204.

The second switching regulator stage 204 utilizes 506 a secondary winding coupled to the inductor L1 of the first switching regulator stage 202 to provide a secondary bias output voltage 214 to the switch controller 204 of the second switching regulator stage 204. The secondary bias output voltage 214 is preferably referenced to the main output voltage 212 or a ground of a the second switching regulator stage 204.

In one embodiment, a standby module 402 shuts off switching of the main output voltage switches Q7, Q8 in response to receiving a standby signal. Preferably, in such an embodiment, additional circuitry is provided to generate an auxiliary output voltage 408 via a second secondary winding of a transformer T1. In such an embodiment, auxiliary power may continue 510 to be provided through the second secondary winding of a transformer T1 to provide power to auxiliary and standby systems, even though the main output voltage 212 is turned off. In this manner, the power supply 102 becomes more efficient and is less expensive. The method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first switching regulator stage that receives an input voltage and provides as an output an intermediate regulated output voltage, wherein the first switching regulator stage comprises at least one inductor and at least one first switch controller that provides one or more signals to one or more switches in the first switching regulator stage to regulate the intermediate regulated output voltage;
   a second switching regulator stage that receives as input the intermediate regulated output voltage from the first switching regulator stage and outputs a regulated main output voltage, the second switching regulator stage comprising at least one second switch controller that provides one or more signals to one or more switches in the second switching regulator stage to regulate the main output voltage of the second regulator stage;
   a primary bias module that utilizes a first secondary winding coupled with the inductor of the first regulator stage to provide a primary bias output voltage to the first switch controller of the first switching regulator stage; and
   a secondary bias module that utilizes a second secondary winding coupled with the inductor of the first regulator stage to provide a secondary bias output voltage to the second switch controller of the second switching regulator stage, the secondary bias module configured to provide the secondary output bias voltage to the second switch controller while the second switching regulator is one of in an operational state and an off state, the secondary bias output voltage referenced to the main output voltage of the second switching regulator stage.

2. The apparatus of claim 1, wherein the secondary bias output voltage and the main output voltage of the second switching regulator stage are referenced to a common ground.

3. The apparatus of claim 2, wherein the second switching regulator stage further comprises a transformer, the transformer comprising a secondary winding from which the main output voltage is derived, the common ground referenced to the secondary winding side of the transformer.

4. The apparatus of claim 3, wherein the transformer further comprises a second secondary winding from which an auxiliary output voltage is derived, the auxiliary output voltage regulated by one or more switches controlled by the switch controller of the second switching regulator stage.

5. The apparatus of claim 4, further comprising a standby module that, in response to receiving a standby signal, shuts off switching of the one or more switches of the second switching regulator stage that regulate the main output voltage such that the main output voltage is shut off.

6. The apparatus of claim 5, wherein the auxiliary output voltage continues to be provided via the second secondary winding of the transformer.

7. The apparatus of claim 1, wherein the secondary bias module further comprises a linear regulator for regulating the secondary bias output voltage.

8. The apparatus of claim 7, wherein the primary bias module further comprises a linear regulator for regulating the primary bias output voltage.

9. A system comprising:
   a switching power supply;
   a first switching regulator stage of the power supply that receives an input voltage and provides as an output an intermediate regulated output voltage, wherein the first switching regulator stage comprises at least one inductor and at least one first switch controller that provides one or more signals to one or more switches in the first switching regulator stage to regulate the intermediate regulated output voltage;
   a second switching regulator stage of the power supply that receives as input the intermediate regulated output voltage from the first switching regulator stage and outputs a regulated main output voltage, the second switching regulator stage comprising at least one second switch controller that provides one or more signals to one or more switches in the second switching regulator stage to regulate the main output voltage of the second regulator stage;
   a primary bias module that utilizes a first secondary winding coupled with the inductor of the first regulator stage to provide a primary bias output voltage to the switch controller of the first switching regulator stage; and
   a secondary bias module that utilizes a second secondary winding coupled with the inductor of the first regulator stage to provide a secondary bias output voltage to the second switch controller of the second switching regulator stage, the secondary bias module configured to provide the secondary bias output voltage to the second switch controller while the second switching regulator is one of in an operational state and an off state, the secondary bias output voltage referenced to the main output voltage of the second switching regulator stage.

10. The system of claim 9, further comprising one or more electronic devices that receive regulated power from the switching power supply.

11. The system of claim 10, wherein at least one of the one or more electronic devices comprises one of a blade server, peripheral component interconnect ("PCI") card, personal computer, laptop, router, switch, personal digital assistant, appliance, and digital media player.

12. The system of claim 9, wherein the second switching regulator stage further comprises a transformer, the transformer comprising a secondary winding from which the main output voltage is derived.

13. The system of claim 12, wherein the transformer further comprises a second secondary winding from which an auxiliary output voltage is derived, the auxiliary output voltage regulated by one or more switches controlled by the switch controller of the second switching regulator stage.

14. The system of claim 9, wherein the primary bias module further comprises a linear regulator for regulating the primary bias output voltage.

15. The system of claim 9, wherein the secondary bias module further comprises a linear regulator for regulating the secondary bias output voltage.

16. A method comprising:
receiving an input voltage at a first switching regulator stage and providing as an output an intermediate regulated output voltage, wherein the first switching regulator stage comprises at least one inductor and at least one first switch controller that provides one or more signals to one or more switches in the first switching regulator stage to regulate the intermediate regulated output voltage;
receiving as an input to a second switching regulator stage the intermediate regulated output voltage from the first switching regulator stage and providing as an output a regulated main output voltage, the second switching regulator stage comprising at least one second switch controller that provides one or more signals to one or more switches in the second switching regulator stage to regulate the main output voltage of the second regulator stage;
utilizing a first secondary winding coupled with the inductor of the first regulator stage to provide a primary bias output voltage to the first switch controller of the first switching regulator stage; and
utilizing a second secondary winding coupled with the inductor of the first regulator stage to provide a secondary bias output voltage to the second switch controller of the second switching regulator stage, the second secondary winding configured to provide the secondary bias output voltage to the second switch controller while the second switching regulator is one of in an operational state and an off state, the secondary bias output voltage referenced to the main output voltage of the second switching regulator stage.

17. A power supply comprising:
a first switching regulator stage that receives an input voltage and provides an intermediate regulated output voltage, wherein the first switching regulator stage comprises at least one inductor and at least one first switch controller that provides one or more signals to one or more switches in the first switching regulator stage to regulate the intermediate regulated output voltage;
a second switching regulator stage that receives as input the intermediate regulated output voltage from the first switching regulator stage and outputs a regulated main output voltage, the second switching regulator stage comprising at least one second switch controller that provides one or more signals to one or more switches in the second switching regulator stage to regulate the main output voltage of the second regulator stage;
a primary bias module that utilizes a first secondary winding coupled with the inductor of the first regulator stage to provide a primary bias output voltage to the first switch controller of the first switching regulator stage;
a secondary bias module that utilizes a second secondary winding coupled with the inductor of the first regulator stage to provide a secondary bias output voltage to the second switch controller of the second switching regulator stage, the secondary bias module configured to provide the secondary output bias voltage to the second switch controller while the second switching regulator is one of in an operational state and an off state, the secondary bias output voltage referenced to the main output voltage of the second switching regulator stage;
wherein the second switching regulator stage further comprises a transformer, the transformer comprising a secondary winding from which the main output voltage is derived;
wherein the transformer further comprises a second secondary winding from which an auxiliary output voltage is derived, the auxiliary output voltage regulated by one or more switches controlled by the switch controller of the second switching regulator stage; and
a standby module that, in response to receiving a standby signal, shuts off switching of the one or more switches of the second switching regulator stage that regulate the main output voltage such that the main output voltage is shut off.

* * * * *